J. KAROLLE.
BAIL AND LID HOLDER.
APPLICATION FILED JAN. 17, 1916.
1,189,363.
Patented July 4, 1916.
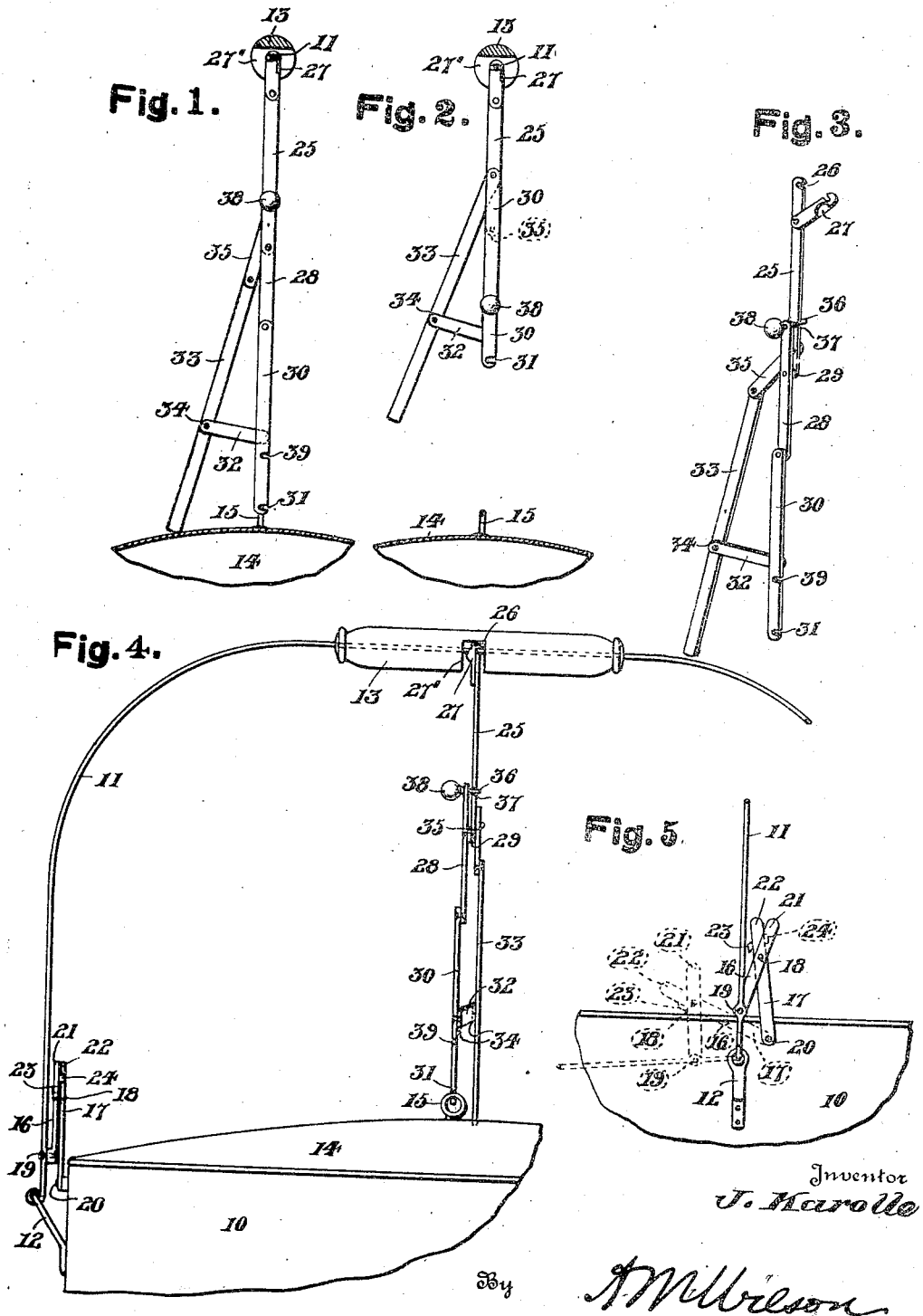

UNITED STATES PATENT OFFICE.

JOHN KAROLLE, OF FLINT, MICHIGAN.

BAIL AND LID HOLDER.

1,189,363.  Specification of Letters Patent.  Patented July 4, 1916.

Application filed January 17, 1916. Serial No. 72,544.

*To all whom it may concern:*

Be it known that I, JOHN KAROLLE, a citizen of the United States, residing at Flint, in the county of Genessee and State of Michigan, have invented certain new and useful Improvements in Bail and Lid Holders, of which the following is a specification.

This invention relates to certain new and useful improvements in bail and lid holders. The primary object of the invention is the provision of a holder for the lid and bail of a bucket or receptacle whereby the lid is retained thereon, while the bail is positioned upright.

A further object of the invention is the provision of a bucket lid retainer and bail holder that is easy and inexpensive to manufacture and which is readily positioned upon a bucket or receptacle during the use thereof for such purposes as cooking or holding articles.

A still further object of the device is the provision of a bucket having a folding movement limiting means for the bail coöperating with a lid retainer removably carried by the bail.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views:—Figure 1 is a side elevation of a portion of the device mounted upon a bucket, the lid and handle being shown in section and in their locked positions. Fig. 2 is a similar view with the lid locking device in released or inoperative position. Fig. 3 is a perspective view of the lid locking and bail positioning device in its bail holding position but detached from the lid. Fig. 4 is a front elevation of a portion of a bucket having the device attached to the bail thereof and illustrated in its operative retaining position between the bail and lid, and Fig. 5 is a side elevation of a portion thereof adjacent one of the bail hinges.

Referring more in detail to the drawings, it will be understood that the device is designed for employment with any form of receptacle having a lid and a bail or handle and the same is herein illustrated in connection with a bucket 10 such as a cooking vessel or a garbage can. The bucket 10 is provided with the usual bail 11 hinged or pivoted to side brackets 12 carried at opposite points upon the bucket and having a heat insulating handle 13 centrally positioned thereon, a lid or cover 14 being provided for the bucket which has the usual ring or hand-hold 15 centrally positioned upon the same.

A folding stop of the form best illustrated in Fig. 5 of the drawings consists of two links 16 and 17 pivoted together intermediate their ends as at 18 but having their inner ends respectively pivoted as at 19 to the bail 11 and at 20 to the sides of the bucket. The shorter legs 21, 22 of the links 16 and 17 are provided respectively with projecting lugs 23 and 24, the lugs 24 on the leg 21 being engaged by leg 22 of link 17 when the bail 11 is in the upright position as shown by full lines in Fig. 5, and when the bail is in rest position, as shown by dotted lines in said figure, the link 16 engages lug 23. In the one instance, namely, when leg 22 engages lug 24, such engagement is above the pivot 18; in the other instance, when link 16 engages lug 23, the point of engagement is below the pivot 18. As shown in full line position, Fig. 5, these links form a stop to prevent the bail moving toward the right, farther than the upright position, and they also prevent the bail dropping down below the dotted line position shown.

The lid retainer as shown in Fig. 3 of the drawings consists of a bar 25 having the outer end thereof provided with a notch 26 adapted to engage over the bail 11 within a cut-away portion or socket 27 of the bail handle 13, while a locking latch 27 fits over the bail for retaining the notch 26 in engagement therewith.

A link 28 is pivoted as at 29 to the inner end of the bar 25, to the inner end of which link 28, a retaining bar 30 is pivoted having a notch 31 at its inner or lower end adapted for hooking engagement with the eye 15 of the lid 14. A connector 32 is rigidly secured at one end to the bar 30, while a retaining foot 33 is pivoted as at 34 to the free end of the said connector, a pivotal link 35 being attached between the mounting bar 25 and the adjacent end of the foot 33.

When the bar 25 is attached to the bail 11 by means of the notch 26 and latch 27, the foot 33 will engage the upper edge of the lid 14 when the link 28 and bar 30 are in substantial longitudinal alinement with each other and with the bar 25, at which time a pin 36 carried by the outer pivoted end of the link 28 is received within a side notch 37 of the bar 25. In this position, it will be seen that the link 35 and foot 33 are in substantial longitudinal alinement which presses the foot 33 against the lid 14 as opposed to the connection between the bail 11 and ring 15, thus providing a substantial A-shaped formation and retaining the lid 14 in position and the bail 11 against pivotal movement in the direction permitted by the foldable stop links 16 and 17.

The free end of the pin 36 is provided with a hand knob 38 whereby the link 28 may be turned upon its pivot 29 after detaching the hook 31 from the ring 15. The pin 36 is thus unseated from the notch 37 and the rod 30 and plate 32 elevated which elevates the foot 33 and link 35 to their inoperative positions as shown in Fig. 2 of the drawings.

It will thus be seen that a serviceable retaining means for a bucket lid and bail are provided which are readily attached to the device for operation. The rod 38 is provided with a side notch 39 within which the adjacent portion of the pin 36 rests when the lid retainer is folded, the portion of the said pin between the knob 38 and the link 28 being received within the said notch 39.

While the form of the invention herein shown and described is what is believed to be the preferred embodiment thereof, it is nevertheless to be understood that minor changes may be made without departing from the spirit and scope of the invention as claimed.

What I claim as new is:—

1. A device of the class described comprising in combination with a bucket having a hinged bail adapted for swinging movement and a closure lid, a double link connecting stop between the said bail and bucket for limiting the swinging movement of the bail, and shiftable link retaining means for the said lid detachably carried by the said bail and having a lid engaging foot.

2. A device of the class described comprising a bucket having a swinging bail and a closure lid, a ring carried by the said lid, a handle upon the said bail having a receiving socket therein, pivoted stop links connecting the bucket and bail at one side of the latter, foldable connections detachably positioned between the said lid eye and the bail within the said handle socket, and a foldable retaining foot for the said lid carried by the said bail and ring connections.

3. A lid retaining device for buckets and like vessels having a swinging bail, comprising a series of links pivoted together in longitudinal alinement, the upper link of the series being detachably secured to the bail, a lid engaging foot having its lower end extending below the lower link of the series when said links are in extended position, a connection between said foot and the lower link of the series, and a link pivoted to the upper end of said foot and the upper link of the series.

In testimony whereof I affix my signature.

JOHN KAROLLE.